US010523658B2

(12) United States Patent
Brouchier et al.

(10) Patent No.: US 10,523,658 B2
(45) Date of Patent: Dec. 31, 2019

(54) SECURING A DATA CONNECTION FOR COMMUNICATING BETWEEN TWO END-POINTS

(71) Applicant: Citrix Systems, Inc., Fort Lauderdale, FL (US)

(72) Inventors: Julien Brouchier, Great Cambourne (GB); Andrew David Cooper, Royston (GB); Richard James Cooper, Bedford (GB); Jean-Luc Claude Robert Giraud, Melbourn (GB); Ian Wright, Ramsey (GB); Christopher Morgan Mayers, Histon (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 92 days.

(21) Appl. No.: 15/695,793

(22) Filed: Sep. 5, 2017

(65) Prior Publication Data
US 2019/0075099 A1   Mar. 7, 2019

(51) Int. Cl.
*H04L 29/06* (2006.01)
*H04L 29/08* (2006.01)
*H04L 9/32* (2006.01)
*H04L 9/08* (2006.01)

(52) U.S. Cl.
CPC ........ *H04L 63/0823* (2013.01); *H04L 9/0861* (2013.01); *H04L 9/3234* (2013.01); *H04L 9/3263* (2013.01); *H04L 63/0281* (2013.01); *H04L 63/0853* (2013.01); *H04L 63/126* (2013.01); *H04L 63/166* (2013.01); *H04L 67/08* (2013.01); *H04L 67/42* (2013.01); *H04L 2209/64* (2013.01); *H04L 2209/80* (2013.01)

(58) Field of Classification Search
CPC ............ H04L 63/1416; H04L 63/1408; H04L 63/1441; H04L 63/1458
USPC .......................................................... 713/151
See application file for complete search history.

(56) References Cited

U.S. PATENT DOCUMENTS

| 9,398,026 B1 | 7/2016 | Dall et al. |
| 2012/0084570 A1* | 4/2012 | Kuzin .................... G06F 21/41 713/182 |
| 2016/0323104 A1 | 11/2016 | Mayers |

OTHER PUBLICATIONS

RFC 5246—T. Dierks et al., "The Transport Layer Security (TLS) Protocol", Ver. 1.2, Aug. 2008, 104 pages.
RFC 5280—D. Cooper et al., "Internet X.509 Public Key Infrastructure Certificate and Certificate Revocation List (CRL) Profile", May 2008, 151 pages.

(Continued)

*Primary Examiner* — Evans Desrosiers
(74) *Attorney, Agent, or Firm* — Banner & Witcoff, Ltd.

(57) ABSTRACT

Methods and systems for securing a data connection for communicating between two end-points are described herein. One of the end-points may be a server and the other of the end-points may be a client that wants to communicate with the server. The data connection may be secured based on a previously-established secure connection and/or a self-signed or self-issued certificate. In some variations, by using the previously-established secure connection and/or a self-signed or self-issued certificate, the secure communication between the server and the client may be conducted without using a third-party authentication service and without requiring a third-party CA to issue a certificate for the server.

20 Claims, 14 Drawing Sheets

(56) References Cited

OTHER PUBLICATIONS

RFC 4279—P. Eronen et al., "Pre-Shared Key Cipersuites for Transport Layer Security (TLS)", Dec. 2005, 15 pages.
RFC 2712—A. Medvinsky et al., "Addition of Kerberos Cipher Suites to Transport Layer Security (TLS)", Oct. 1999, 7 pages.
E. Rescorla, "The Transport Layer Security (TLS) Protocol", Ver. 13 (draft-ieff-tls-tls13-20), Apr. 2017, 137 pages.
Y. Sheffer et al., "Use of Short-Term, Automatically-Renewed (STAR) Certificates to Address the LURK Problem", (draft-sheffer-acme-star-lurk-00), Oct. 25, 2016, 10 pages.
Nov. 14, 2018—(WO) International Search Report and Written Opinion of the ISR—App PCT/US2018/049522.

* cited by examiner

SECURING A DATA CONNECTION FOR COMMUNICATING BETWEEN TWO END-POINTS

FIELD

Aspects described herein generally relate to securing a data connection between two end-points. Additional aspects described herein generally relate to securing a data connection for a virtual computing environment.

BACKGROUND

The security of a data communication is an important consideration in modern computing systems. If a data communication is insecure, a malicious entity may be able to intercept and use the included data in malicious ways. One manner of securing a data communication includes data encryption. However, some encryption schemes allow for malicious entities to determine the encryption key being used and decrypt any intercepted data communication that was encrypted using that key. For example, if one end-point communicates, to the other end-point, a public encryption key that will be used to encrypt a data communication, a malicious entity using a man-in-the-middle attack can intercept the transmission of the public encryption key. Thereafter, the malicious entity can intercept the data communication, substitute their public encryption key, manipulate the unencrypted data (e.g., inject some malicious code), re-encrypt the manipulated data using the public encryption key, and send the re-encrypted data on to its destination end-point. Both end-points may be unaware that the malicious entity performed this process.

There are other, more secure methods, of protecting a data transmission and some of these methods may protect against the man-in-the-middle attack described above. For example, a trusted third party, which is trusted by both end-points, may be used to certify the authenticity of a public key. One common trusted third party is a certificate authority (CA), which issues a digital certificate for securing digital communications. Both end-points may rely on the CA to establish the authenticity of the digital certificate. In a client-server model, the CA issues a digital certificate to the server and clients use the digital certificate to secure connections to the server. One common protocol that uses digital certificates to secure connections is the Transport Layer Security (TLS) protocol.

The use of digital certificates, however, is not without drawbacks. For example, virtual servers have a number of characteristics that make digital certificates more difficult to manage and more expensive than it is for hardware server counterparts. Indeed, the CA may issue a certificate for use during the lifetime of a server. This works well for a conventional hardware server, which may have a lifetime measured in weeks or years. A virtual server, however, may have a lifetime measured in hours or less. Thus, the window of usage for an issued digital certificate is much shorter for a virtual server. A conventional hardware server also may have a local secure location for storing a private key used in connection with the digital certificate. A virtual server, however, may not have a local secure location for storing its private key. Thus, the overall security of a virtual server is lessened. The number of hardware servers in a large server environment can typically be measured in the order of the hundreds. For large virtual server environments, however, there can be thousands of virtual servers. Thus, the sheer number of certificates that need to be managed and/or paid for is much larger.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations described above, and to overcome other limitations that will be apparent upon reading and understanding the present disclosure, aspects described herein are directed towards securing a data connection for communicating between two end-points. Additional aspects described herein generally relate to securing a data connection for a virtual computing environment. In some aspects, the data connection between a server and a client device may be secured by communicating to/from the client device using previously-established security mechanisms including, for example, one or more secure connections, one or more secure channels, or one or more secure messages. In some variations, these previously-established secure connections, channels or messages may be integrity protected. Further aspects described herein generally relate to securing a data connection to a server using self-signed or self-issued certificates.

In some embodiments, a self-signed or self-issued certificate for a server may be generated. A first secure data connection between a computing device and a client device may be established. In some variations, the first secure data connection may be an integrity-protected connection or may be configured to carry integrity-protected messages. Via the first secure data connection, a request for an enterprise resource or enterprise service may be received from the client device. In some embodiments, the request for the enterprise resource or enterprise service may be a request for a session of a remote desktop service. The self-signed or self-issued certificate may be processed in preparation for establishing a second secure data connection. In some variations, the second secure data connection may be a confidentiality- and integrity-protected connection. In some embodiments, the processing of the self-signed or self-issued certificate may include transmitting the self-signed or self-issued certificate to the client device, or storing the self-signed or self-issued certificate in a secure location that is accessible to a gateway. The second secure data connection may be established using the self-signed or self-issued certificate. In some variations, the second secure data connection may be between the client device and the server, or may be between a gateway and the server. After establishing the second secure data connection, data originally transmitted from the client device may be transmitted to the server via the second secure data connection.

These and additional aspects will be appreciated based on discussion of the present disclosure.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
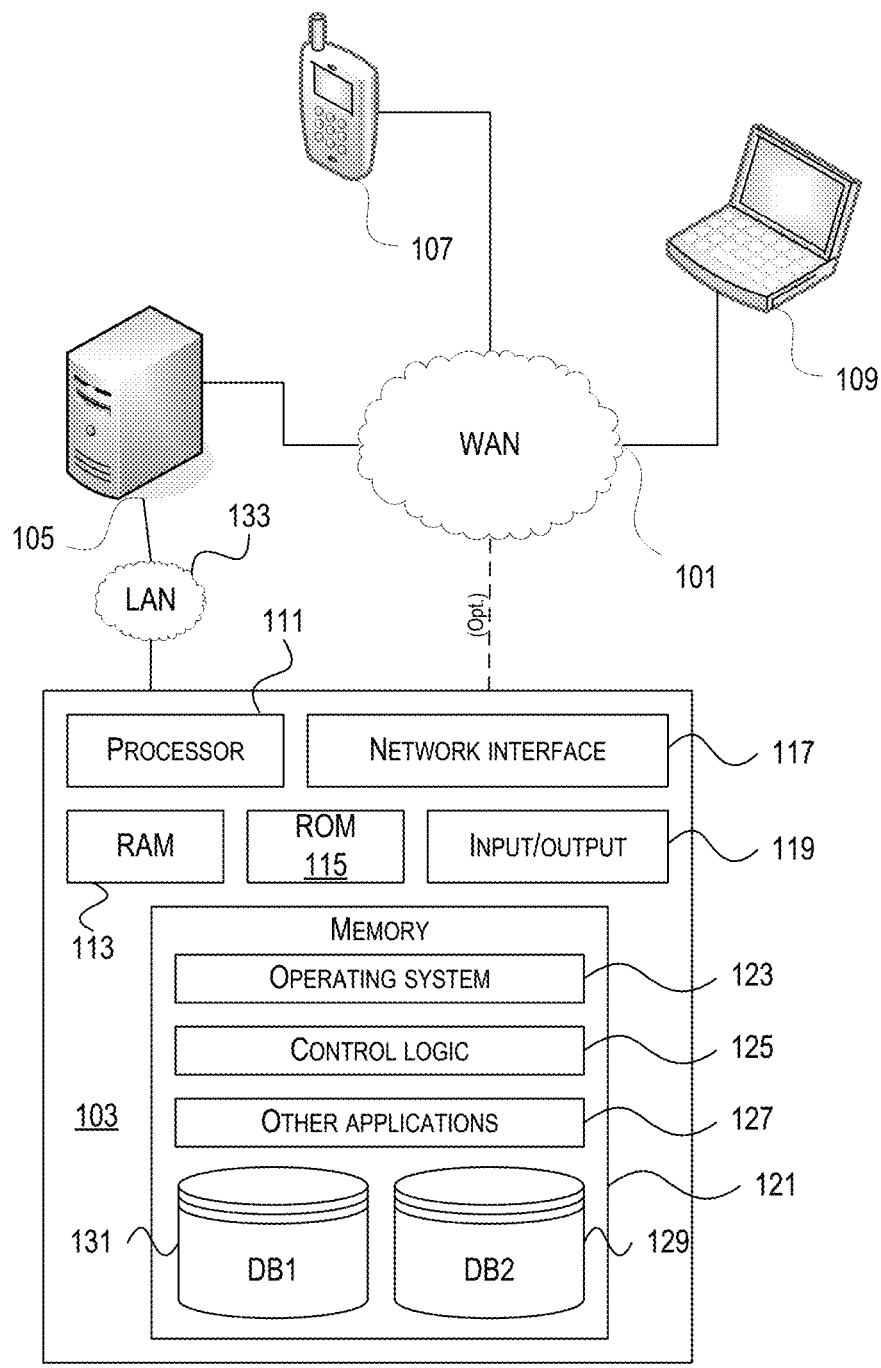
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards securing a data connection for communicating between two end-points. Additional aspects described herein generally relate to securing a data connection to an end-point of a virtual computing environment. Further aspects described herein generally relate to securing a data connection using self-signed or self-issued certificates.

More particularly, aspects described herein relate to methods, devices and systems that provide two end-points with the data necessary to establish a secure data connection between the two end-points. To address one or more of the drawbacks described above, various embodiments described throughout this disclosure will use previously-established data security mechanisms in connection with providing the two end-points with the data necessary to establish the secure connection between the two end-points. In some embodiments, the previously-established data security mechanisms may be, for example, a previously-established secure data connection, a previously-established secure data channel, or a previously-established secure data message. Additionally, some embodiments may require that the previously-established data security mechanism protect certain aspects of data security, such as confidentiality and/or integrity.

Confidentiality and integrity are two of the many aspects of data security. A particular data security mechanism may be designed based on one or more of those two aspects. Confidentiality may refer to protecting data from disclosure to malicious or otherwise unauthorized entities. As one example, encryption techniques may be used to protect the confidentiality of data. Integrity may refer to protecting data from being modified by malicious or otherwise unauthorized entities. As one example, hashing techniques may be used to protect the integrity of data.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
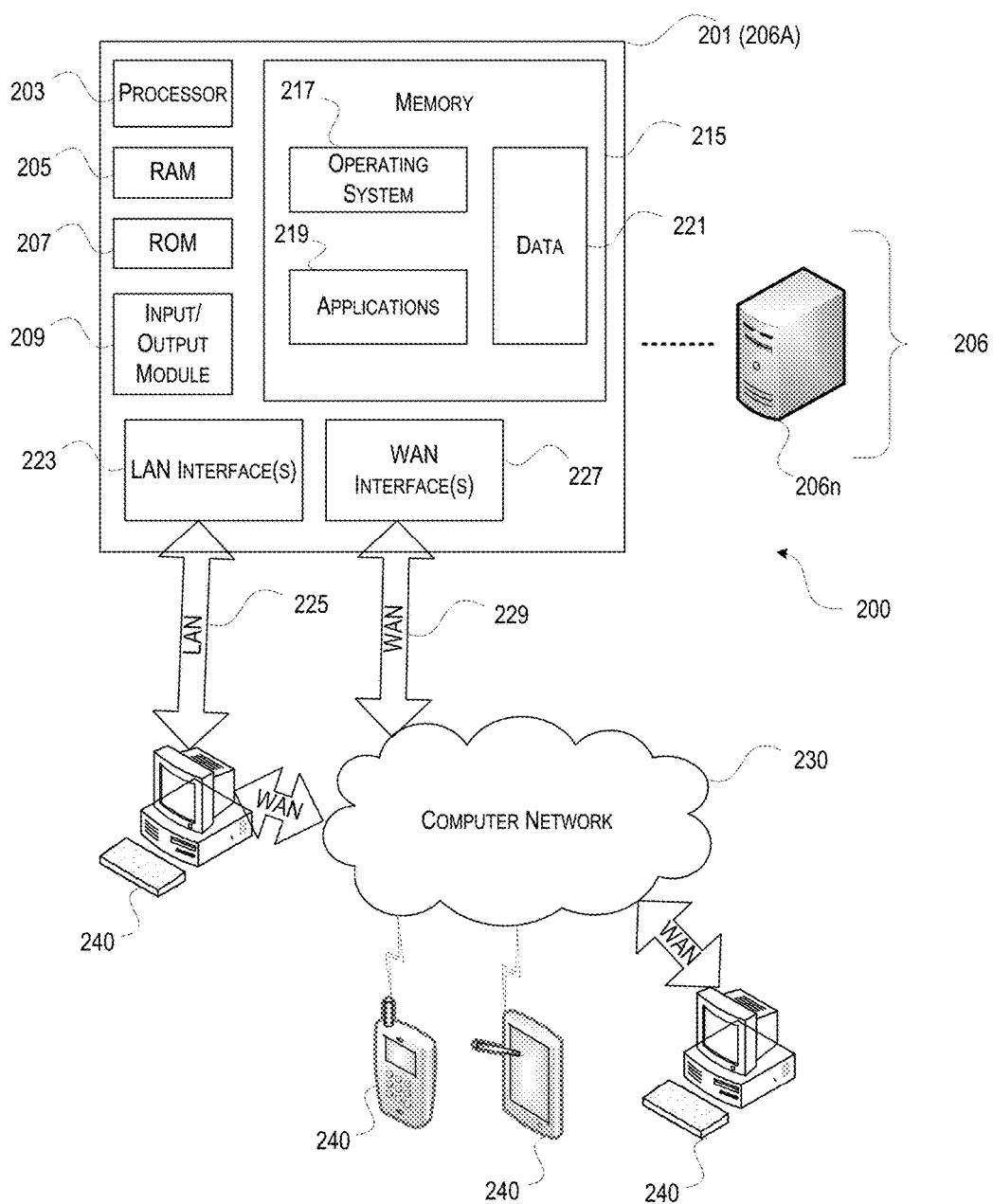
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) configured to provide virtual machines for client access devices. The computing device 201 may have a processor 203 for controlling overall operation of the server and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
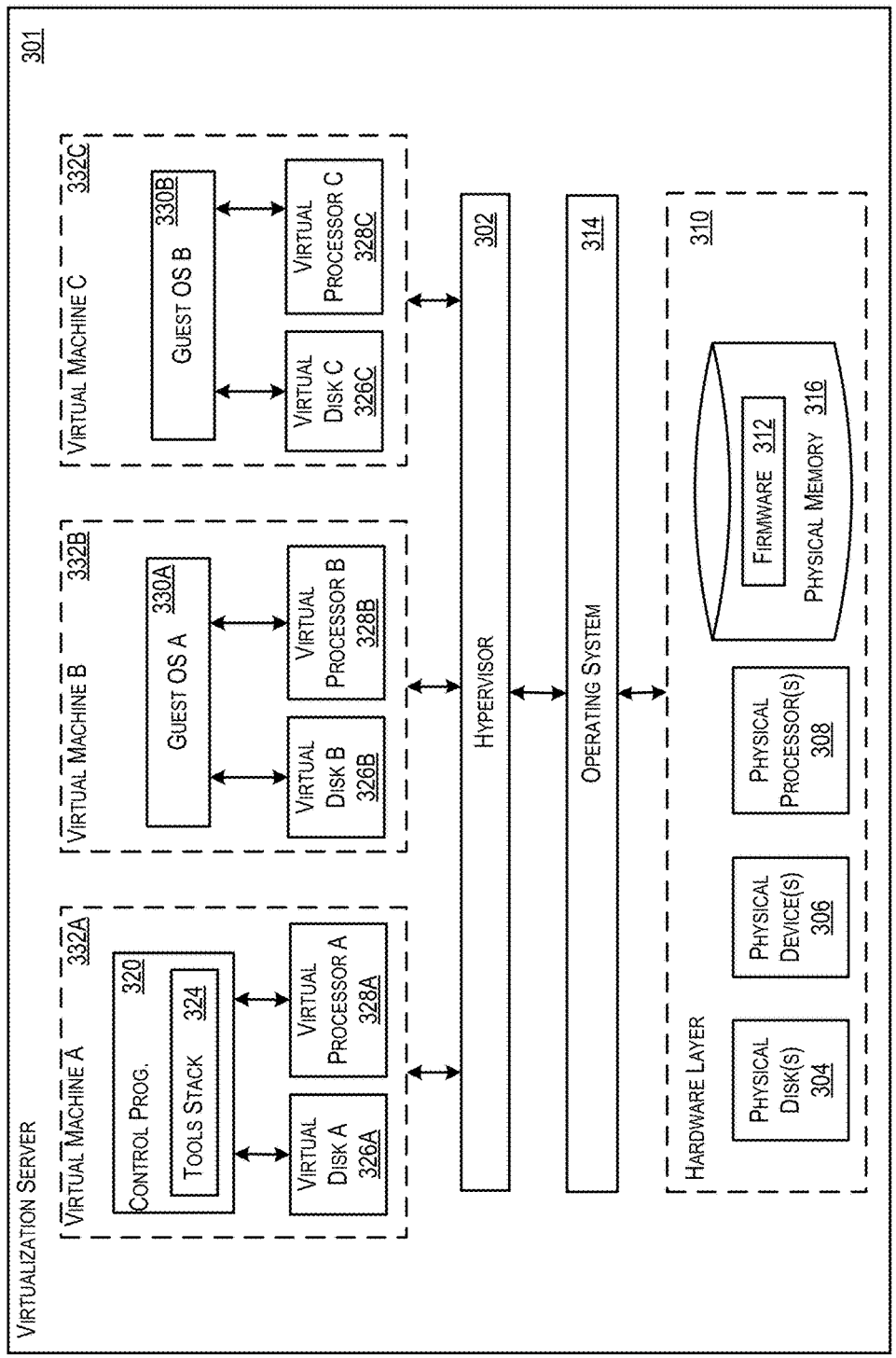
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
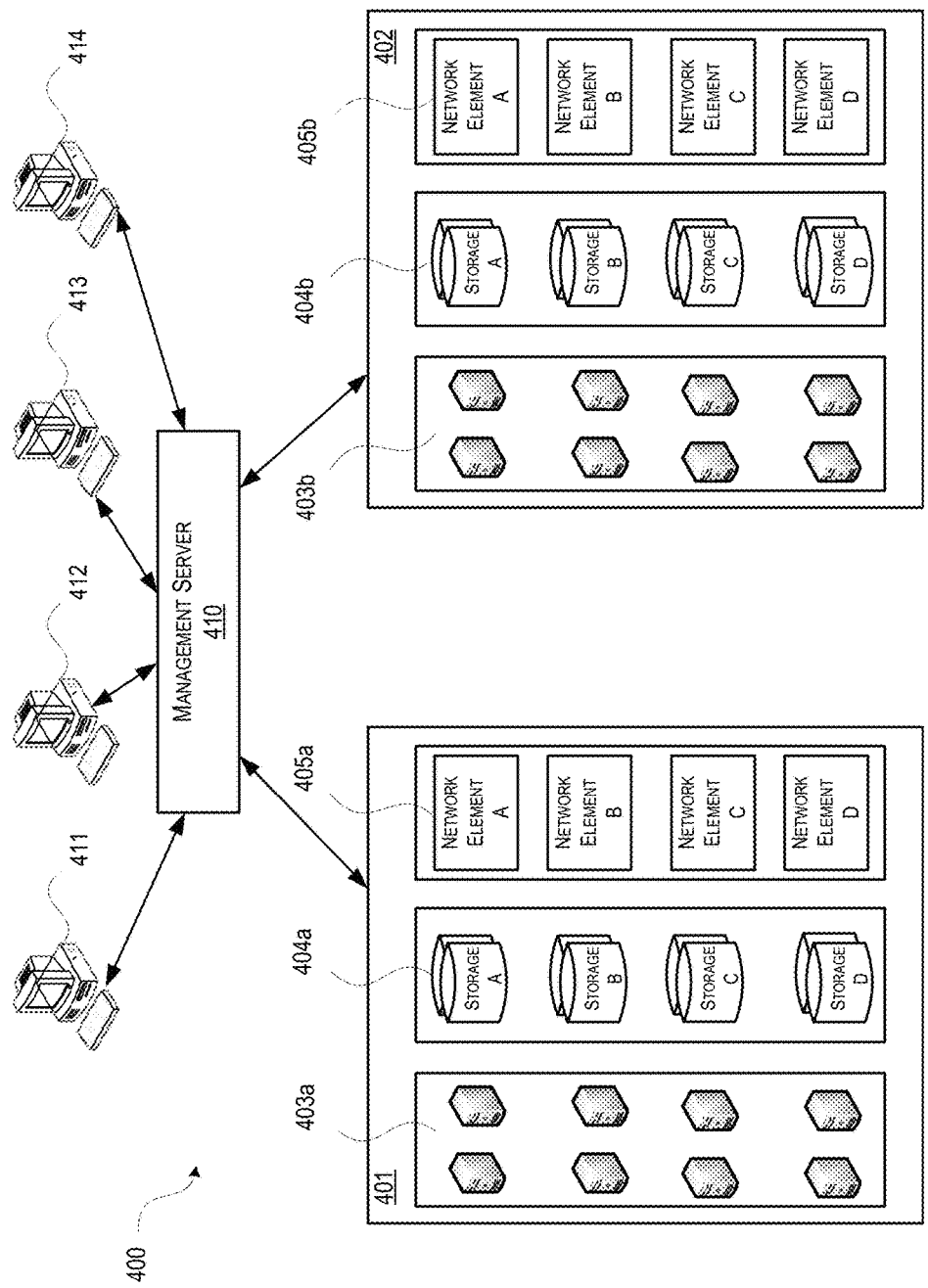
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network resources 405a-405b (generally referred herein as "network resources 405")) of the cloud system.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
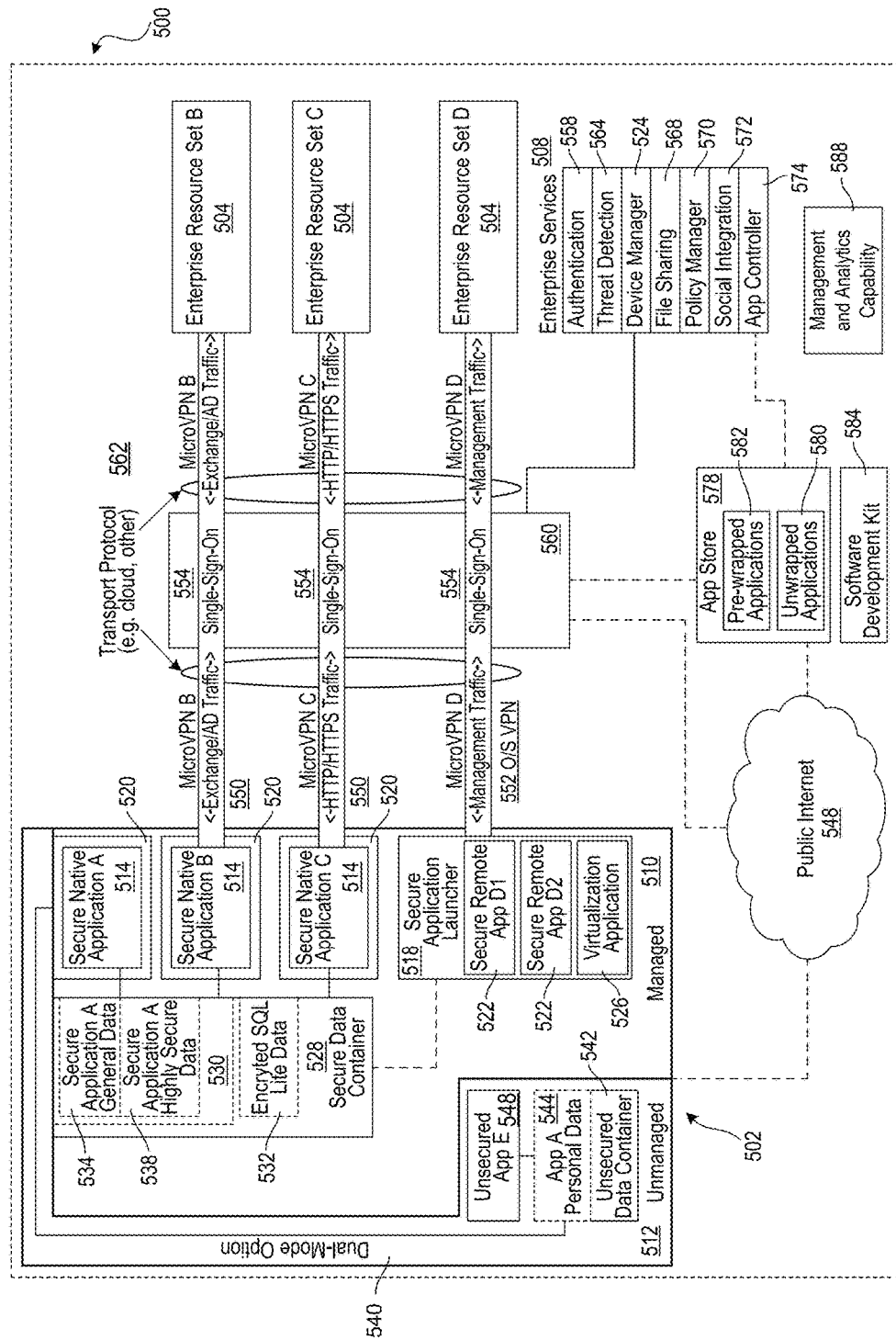
FIG. 5 depicts an illustrative enterprise mobility management system that may be used in accordance with one or more illustrative aspects described herein.

FIG. 5 represents an enterprise mobility technical architecture 500 for use in a "Bring Your Own Device" (BYOD) environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device 502 may run an iOS operating system, an Android operating system, or the like. The enterprise may choose to implement policies to manage the mobile device 502. The policies may be implemented through a firewall or gateway in such a way that the mobile device 502 may be identified, secured or security verified, and provided selective or full access to the enterprise resources (e.g., 504 and 508.) The policies may be mobile device management policies, mobile application management policies, mobile data management policies, or some combination of mobile device, application, and data management policies. A mobile device 502 that is managed through the application of mobile device management policies may be referred to as an enrolled device.

In some embodiments, the operating system of the mobile device 502 may be separated into a managed partition 510 and an unmanaged partition 512. The managed partition 510 may have policies applied to it to secure the applications running on and data stored in the managed partition 510. The applications running on the managed partition 510 may be secure applications. In other embodiments, all applications may execute in accordance with a set of one or more policy files received separate from the application, and which define one or more security parameters, features, resource restrictions, and/or other access controls that are enforced by the mobile device management system when that application is executing on the mobile device 502. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is not accessible by unmanaged applications and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application 514 is executed on the mobile device 502. The secure application wrapper 520 may include meta-data that points the secure native application 514 running on the mobile device 502 to the resources hosted at the enterprise (e.g., 504 and 508) that the secure native application 514 may require to complete the task requested upon execution of the secure native application 514. The secure remote applications 522 executed by a secure application launcher 518 may be executed within the secure application launcher 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 526 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 502, this arrangement may also be elected for certain applications. For example, while some applications may be secured for use on the mobile device 502, others might not be prepared or appropriate for deployment on the mobile device 502 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 502 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 502 as well as a virtualization application 526 to allow access to applications that are deemed more properly operated on the server side. In an embodiment, the virtualization application 526 may store some data, files, etc. on the mobile device 502 in one of the secure storage locations. An enterprise, for example, may elect to allow certain information to be stored on the mobile device 502 while not permitting other information.

In connection with the virtualization application 526, as described herein, the mobile device 502 may have a virtualization application 526 that is designed to present GUIs and then record user interactions with the GUI. The virtualization application 526 may communicate the user interactions to the server side to be used by the server side application as user interactions with the application. In response, the application on the server side may transmit back to the mobile device 502 a new GUI. For example, the new GUI may be a static page, a dynamic page, an animation, or the like, thereby providing access to remotely located resources.

The secure applications 514 may access data stored in a secure data container 528 in the managed partition 510 of the mobile device 502. The data secured in the secure data container may be accessed by the secure native applications 514, secure remote applications 522 executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the mobile device 502 upon receipt of a command from the device manager 524. The secure applications (e.g., 514, 522, and 526) may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 546 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device 502 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 502 may connect to enterprise resources 504 and enterprise services 508 at an enterprise, to the public Internet 548, and the like. The mobile device 502 may connect to enterprise resources 504 and enterprise services 508 through virtual private network connections. The virtual private network connections, also referred to as microVPN or application-specific VPN, may be specific to particular applications (as illustrated by microVPNs 550, particular devices, particular secured areas on the mobile device (as illustrated by O/S VPN 552), and the like. For example, each of the wrapped applications in the secured area of the mobile device 502 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway 560 may also re-route traffic from the mobile device 502 to the public Internet 548, enabling the mobile device 502 to access publicly available and unsecured applications that run on the public Internet 548. The mobile device 502 may connect to the access gateway via a transport network 562. The transport network 562 may use one or more transport protocols and may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud-based resources, and the like. The enterprise resources 504 may be accessed by the mobile device 502 directly or through the access gateway 560. The enterprise resources 504 may be accessed by the mobile device 502 via the transport network 562.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services, and the like. Authentication services 558 may use certificates. The certificates may be stored on the mobile device 502, by the enterprise resources 504, and the like. The certificates stored on the mobile device 502 may be stored in an encrypted location on the mobile device 502, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store 578 may be provided with an intuitive and easy to use user interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
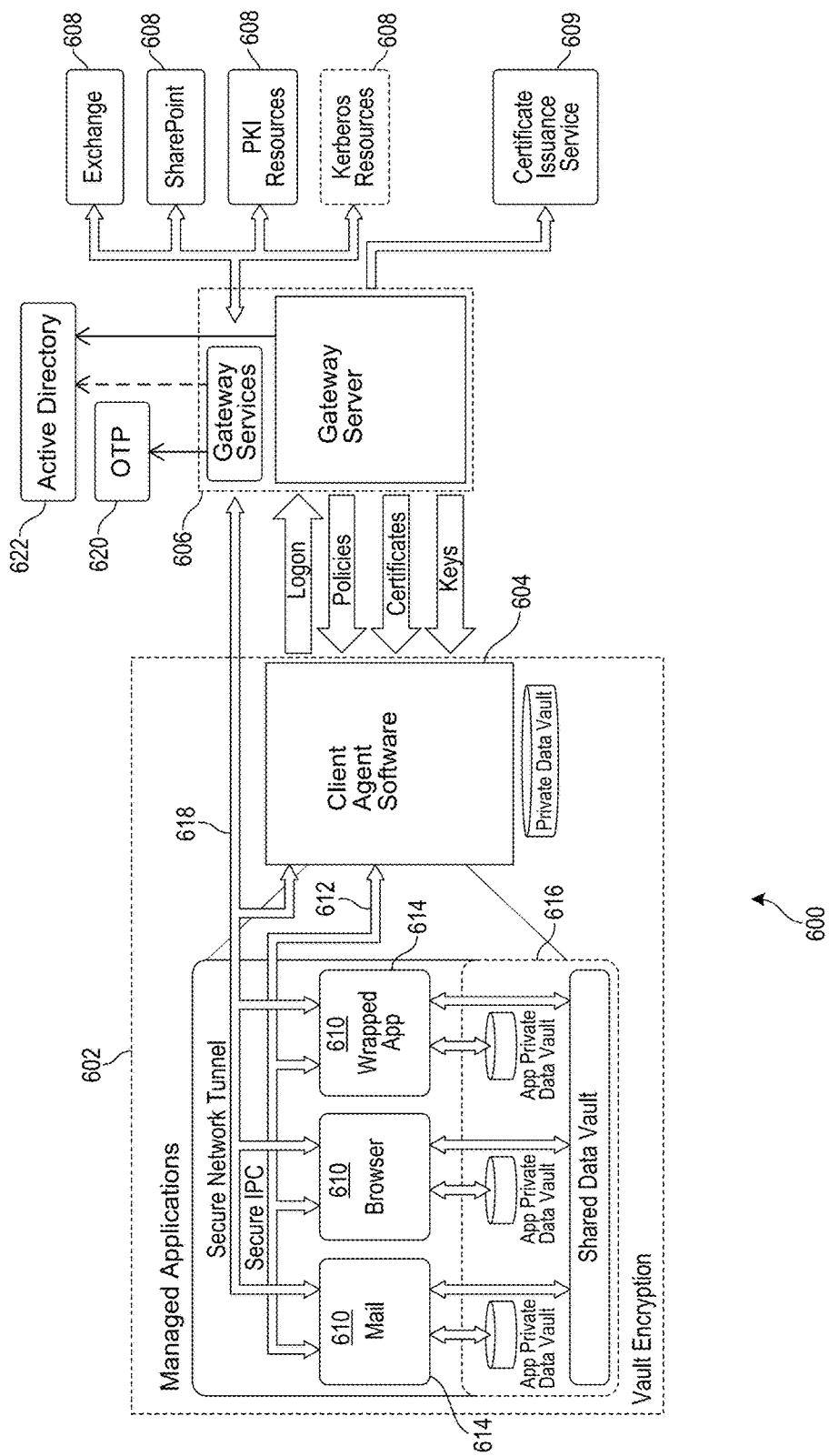
FIG. 6 depicts another illustrative enterprise mobility management system that may be used in accordance with one or more illustrative aspects described herein.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the mobile device 602. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) 606 with SSO to other gateway server components. The client agent 604 obtains policies from gateway server 606 to control the behavior of the managed applications 610 on the mobile device 602.

The Secure InterProcess Communication (IPC) links 612 between the native applications 610 and client agent 604 represent a management channel, which may allow a client agent to supply policies to be enforced by the application management framework 614 "wrapping" each application. The IPC channel 612 may also allow client agent 604 to supply credential and authentication information that enables connectivity and SSO to enterprise resources 608. Finally, the IPC channel 612 may allow the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 may request policy information from client agent 604, which in turn may request it from gateway server 606. The application management framework 614 may request authentication, and client agent 604 may log into the gateway services part of gateway server 606 (also known as NETSCALER ACCESS GATEWAY). Client agent 604 may also call supporting services on gateway server 606, which may produce input material to derive encryption keys for the local data vaults 616, or may provide client certificates which may enable direct authentication to PM protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel 612 and obtain the policy for that application. The application management framework 614 may enforce relevant portions of the policy that apply locally, such as the client agent login dependencies and some of the containment policies that restrict how local OS services may be used, or how they may interact with the managed application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 may be responsible for orchestrating the network access on behalf of each managed application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application 610 may use a special background network access mechanism that allows it to access an Exchange server 608 over an extended period of time without requiring a full AG logon. The Browser application 610 may use multiple private data vaults 616 to segregate different kinds of data.

This architecture may support the incorporation of various other security features. For example, gateway server 606 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. If or when data is stored locally on the mobile device 602 in the secure container 616, it may be preferred that a minimum of AES 256 encryption algorithm be utilized.

Other secure container features may also be implemented. For example, a logging feature may be included, wherein security events happening inside a managed application 610 may be logged and reported to the backend. Data wiping may be supported, such as if or when the managed application 610 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 602 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, if or when a managed application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text may be sent to the user with an OTP 620. In some cases, this may be implemented only for online use, with a prompt being a single field.

An offline password may be implemented for offline authentication for those managed applications 610 for which offline use is permitted via enterprise policy. For example, an enterprise may want StoreFront to be accessed in this manner In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 610 as secondary credentials (for the purpose of accessing PM protected web resources via the application management framework micro VPN feature). For example, a managed application 610 may utilize such a certificate. In this case, certificate-based authentication using ActiveSync protocol may be supported, wherein a certificate from the client agent 604 may be retrieved by gateway server 606 and used in a keychain. Each managed application 610 may have one associated client certificate, identified by a label that is defined in gateway server 606.

Gateway server 606 may interact with an enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PM protected network resources. More than one certificate may be supported, such as to match various levels of security and/or separation requirements. The certificates may be used by the Mail and Browser managed applications 610, and ultimately by arbitrary wrapped applications 610 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 610 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL or TLS may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when HTTP (but not HTTPS) connections are proxied in VPN and MicroVPN mode.

Another feature may relate to application container locking and wiping, which may automatically occur upon jailbreak or rooting detections, and occur as a pushed command from administration console, and may include a remote wipe functionality even when a managed application 610 is not running.

A multi-site architecture or configuration of enterprise application store and an application controller may be supported that allows users to be serviced from one of several different locations in case of failure.

In some cases, managed applications 610 may be allowed to access a certificate and private key via an API (for example, OpenSSL). Trusted managed applications 610 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

Securing a Data Connection Between Two End Points

As mentioned above, aspects described herein are directed towards securing a data connection between two end-points. Additional aspects described herein generally relate to securing a data connection to an end-point of a virtual computing environment. Further aspects described herein generally relate to securing a data connection using self-signed or self-issued certificates. In connection with these aspects, and others, FIG. 7 depicts an example block diagram for securing a data connection between two end-points.

Figure 7:
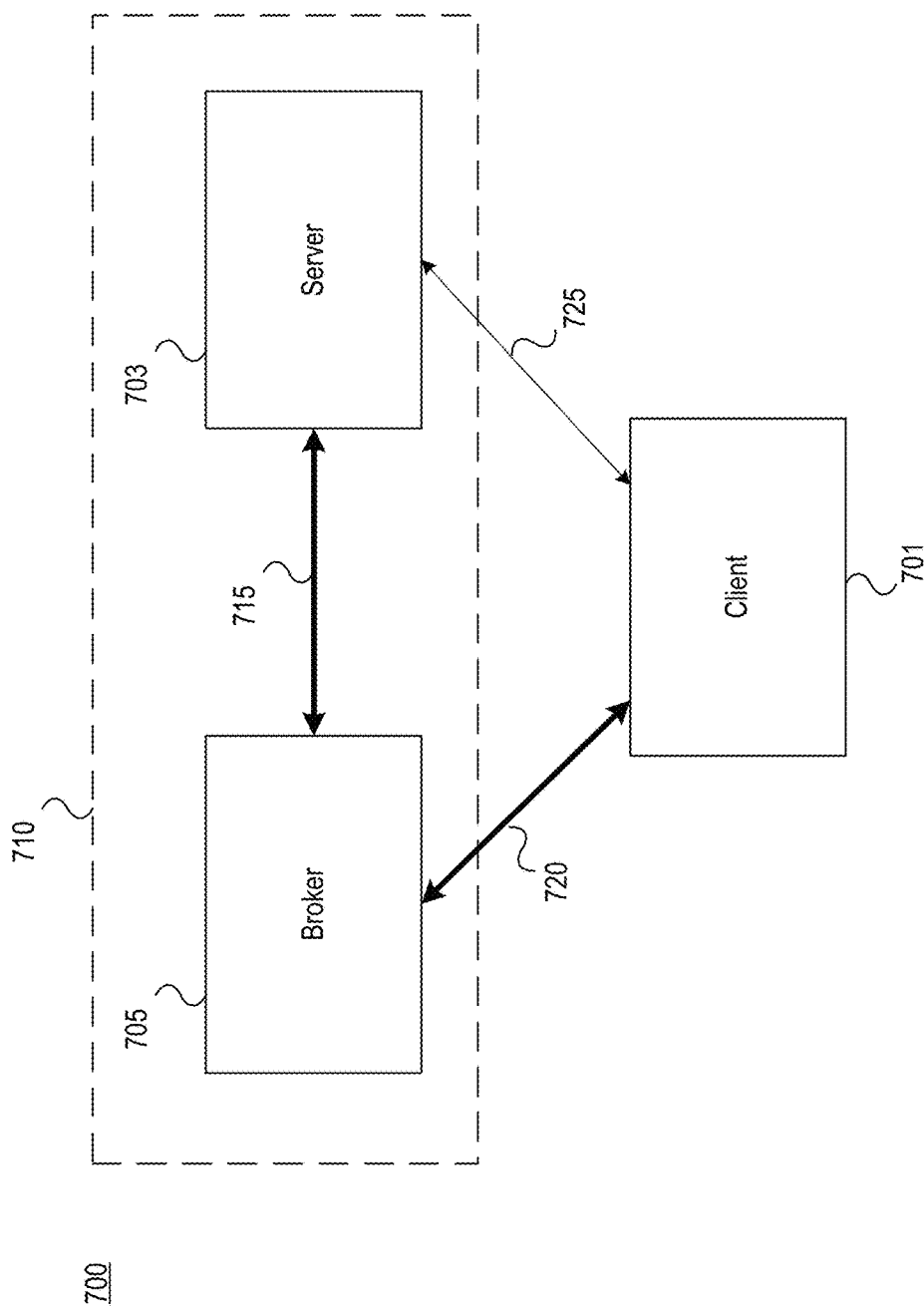
FIG. 7 depicts an example block diagram for securing a data connection between two end-points in accordance with one or more illustrative aspects described herein.

In FIG. 7, a simplified system architecture 700 is illustrated and, as depicted, includes a client 701, a server 703, and a broker 705 are shown. In various embodiments, the simplified system architecture 700 of FIG. 7 could represent different portions of the system architectures described in connection with FIGS. 1-6. For example, the client 701 may be one of the devices 107 and 109 from FIG. 1; a client device 240 from FIG. 2; client computers 411-414 from FIG. 4; mobile device 502 from FIG. 5; or mobile device 602 from FIG. 6. The server 703 may, for example, be device 103 from FIG. 1; server 206n from FIG. 2; virtualization server 301 from FIG. 3; one of the virtualization machines 332A, 332B and 332C from FIG. 3; one of the host servers 403a and 403b from FIG. 4; a server (virtual or hardware) configured to provide enterprise resource set D 504 from FIG. 5; or a server (virtual or hardware) configured to provide one or more of enterprise resources 608 and services 609 from FIG. 6. The broker 705 may, for example, be device 105 from FIG. 1; computing device 201 from FIG. 2; management server 410 from FIG. 4; gateway device 560 from FIG. 5; application store 578 from FIG. 5; a server (virtual or hardware) configured to provide enterprise resource set A 504 from FIG. 5; gateway server 606 from FIG. 6; or a server (virtual or hardware) configured to provide an enterprise resource 608 and 609 from FIG. 6. Additionally, in some variations, the server 703 may be a stateless server.

Based on the system architectures of FIGS. 1-6, data connections 715, 720 and 725 may take various forms. For example, the data connections may be TLS or non-TLS connections. The data connections may be a micro VPN tunnel, or some other type of VPN tunnel. The data connections may be a mix of different types. For example, data connection 715 may be a non-TLS integrity-protected connection, data connection 720 may be a micro VPN tunnel, and data connection 725 may be a TLS connection. Other embodiments could use a different mix of data connection types and/or different types of data connections than the above-mentioned mixes and types. Additionally, in some variations, a specific connection may use SSL instead of TLS. The various embodiments described herein will be described as using TLS for simplicity.

The server 703 and the broker 705 may be managed or otherwise under the control of an enterprise 710 (e.g., the enterprise described in connection with FIGS. 5 and 6). The broker 705 and the server 703 may be able to communicate with each other via data connection 715. The broker 705 and the client 701 may be able to communicate with each other via data connection 720. In some variations, the data connection 720 may not be directly between the broker 705 and the client 701. For example, data connection 720 may be between an enterprise device (not shown), such as an enterprise application store, and the client, and the broker 705 may transmit any needed data to the enterprise device. Data connections 715 and 720 may have been established as a secure connection (e.g., integrity-protected data connection, confidentiality-protected data connection, etc.) or may have been established to transmit data secured by one or more other data security mechanisms. The data connection 720 or the other data security mechanisms associated with the data connection 720 may be collectively referred to as one or more previously-established data security mechanisms.

The client 701 may desire to establish a secure connection 725 with server 703. In some embodiments, using the one or more previously-established data security mechanisms, the client 701 may be provided with the data necessary for the client 701 to establish a secure data connection 725 to the server 703. In some embodiments, the data connection 725 may be between the server 703 and the client 701 (as shown). In other embodiments, using the one or more previously-established data security mechanisms, the client 701 can cause one or more other devices to establish the secure data connection 725 to the server 703. Thereafter, the client 701 may be able to access the server 701 via the secure data connection 725. For example, the data connection 725 may be between a gateway (e.g., gateway device 560 of FIG. 5; or gateway server 606 of FIG. 6) and the server 703, and the client 701 may access, via the gateway, the server 703 using the secure data connection 725. In some variations, the data connection 725 may be established using a certificate that was signed and issued by the server 703. In other words, the data connection 725 may be established using a self-signed or self-issued certificate, with the "self" in this instance being server 703.

Additional details and variations of the depicted arrangement will be discussed below in connection with the remaining figures and, in particular, in connection with the block diagrams of FIGS. 9 and 11. Further, while FIG. 7 depicts an arrangement that includes a single server, a single client and a single server, there may be multiple clients attempting to use the enterprise resources and services. There may be multiple servers for providing the enterprise resources and services. And there may be multiple brokers for managing the processing of the server's security credentials and/or the assigning of clients to the servers.

Figure 8:
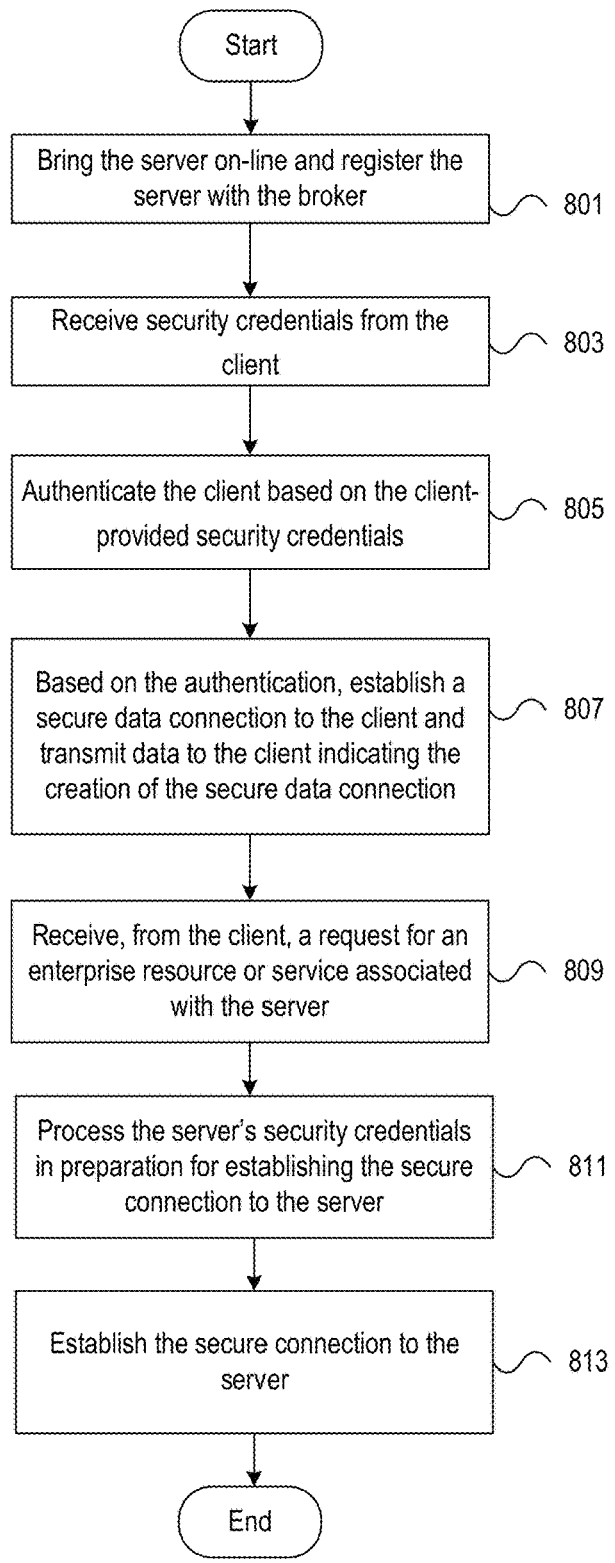
FIG. 8 illustrates an example method for establishing a secure data connection to a server using one or more previously-established data security mechanisms in accordance with one or more illustrative aspects described herein.

FIG. 8 illustrates an example method for establishing a secure data connection to a server using one or more previously-established data security mechanisms. In particular, the method of FIG. 8 depicts the steps performed by one or more devices (e.g., broker 705, server 703, etc.) of an enterprise to establish a secure data connection between the enterprise (enterprise 710) and a client (e.g., client 701) and then use that secure data connection to enable the creation of another secure data connection between the client and a server (e.g., server 703).

At step 801, the one or more devices of the enterprise may bring the server on-line and register the server with the broker. This step may include, for example, creating the server's security credentials, transmitting the security credentials to various enterprise devices, and/or storing the security credentials in a secure enterprise location. The self-signed certificate may be used instead of a certificate issued by a third-party CA. A certificate issued by a third-party CA may be referred herein as a third-party CA certificate. Thus, the need to contact a third-party CA and/or the need to use a third-party CA certificate may be avoided and, thus, no third-party CA certificate may be issued for the server.

At step 803, the one or more devices of the enterprise receive security credentials from the client. The client's security credentials may include a certificate issued by a CA or some other credential that is needed to authenticate the client.

At step 805, the one or more devices of the enterprise may authenticate the client based on the client-provided security credentials. For example, the authentication may include validating a certificate issued by a CA or some other security credential received at step 801.

At step 807, based on the authentication, the one or more devices of the enterprise may establish a secure data connection to the client and transmit data to the client indicating the creation of the secure data connection. For example, the one or more devices may transmit an .ICA file to the client.

At step 809, the one or more devices of the enterprise may receive, from the client, a request for an enterprise resource or service associated with the server. For example, the request may be for any one of the enterprise resources or services described in connection with FIG. 5 or 6.

At step 811, the one or more devices of the enterprise may process the server's security credentials in preparation for establishing the secure connection to the server. The processing of this step may include, for example, transmitting the server's security credentials to a secure enterprise location, retrieving the server's security credentials from a secure enterprise location, and/or transmitting the credentials to the client via the previously-established secure connection (e.g., the secure connection established at step 807). The previously-established connection may be an integrity-protected connection or may carry integrity-protected messages.

Any connection that can be considered "previously-established" may be a connection that has been established prior to a time when the processing of the server's security credentials in preparation for establishing the secure connection to the server has begun or has completed. In FIGS. 7, 9 and 11, any connection that can be considered "previously established" is illustrated as having an increased weight as compared to the connection for the secure connection to the server. For example, FIG. 7 illustrates connections 715 and 720 as having an increased weight as compared to secure connection 725.

At step 813, the one or more devices of the enterprise may establish the secure connection to the server. For example, in some arrangements, the secure connection may be between the client and the server. In this arrangement, the client may have received the server's security credentials previously and may receive, in connection with establishing the secure connection to the server, another copy of the security credentials from the server. The client can validate the received copy based on the previously-received security credentials and then establish the secure connection to the server. As another example, in some arrangements, the secure connection may be between the server and a gateway of the enterprise. The gateway may retrieve the server's credentials from the secure enterprise location, receive a copy of the security credentials from the server, validate the received copy based on the retrieved security credentials and then establish the secure connection to the server. Thereafter, the client can access the server, via the gateway, using the secure connection. The secure connection may be a TLS connection.

The example method of FIG. 8 provides a general overview that will be further described in connection with the FIGS. 9-11 and 12A-12C, which describe two example embodiments. The depicted flows of the two example embodiments (e.g., FIGS. 10 and 12) may illustrate only a subset of the steps from the example method of FIG. 8. For example, steps 803-807 may have been performed prior to the example flow of FIG. 10. Additional modifications or variations to the example method of FIG. 8 may be apparent based on the description of FIGS. 9-11 and 12A-12C.

Figure 9:
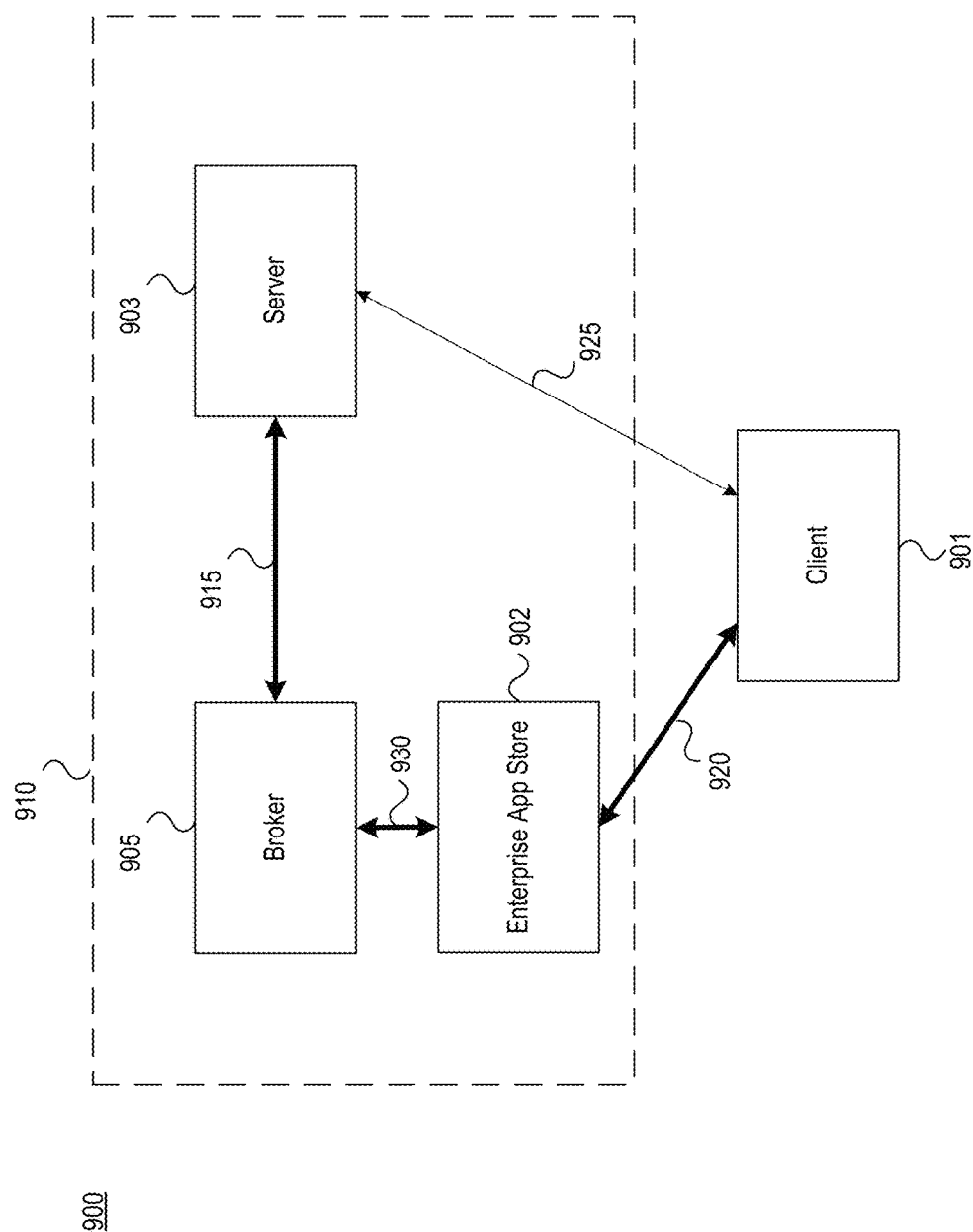
FIG. 9 illustrates an example block diagram where the secure connection to the server is established between the client and the server in accordance with one or more illustrative aspects described herein.
Figure 10:
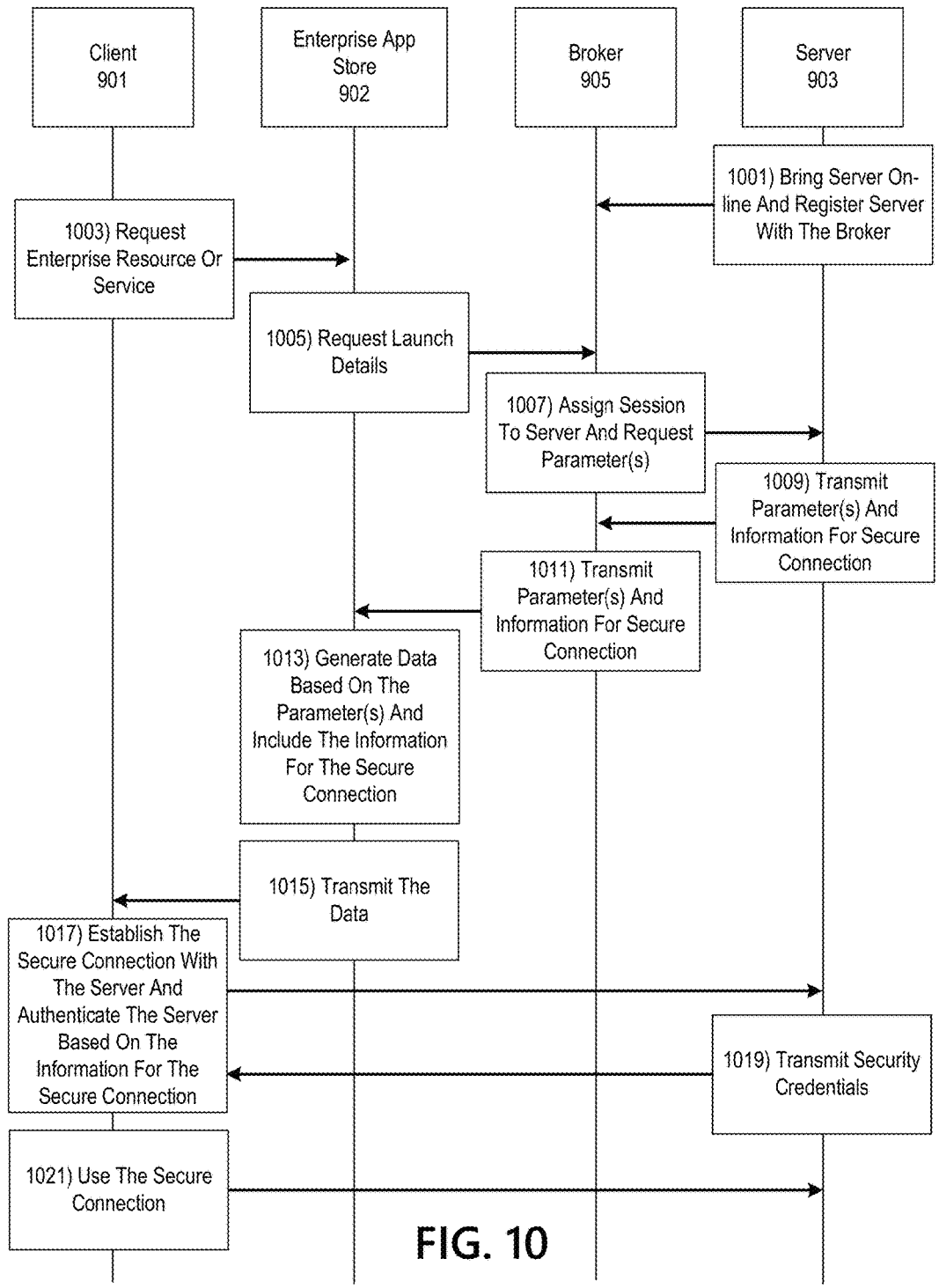
FIG. 10 illustrates an example process flow where the secure connection to the server is established between the client and the server in accordance with one or more illustrative aspects described herein.
Figure 11:
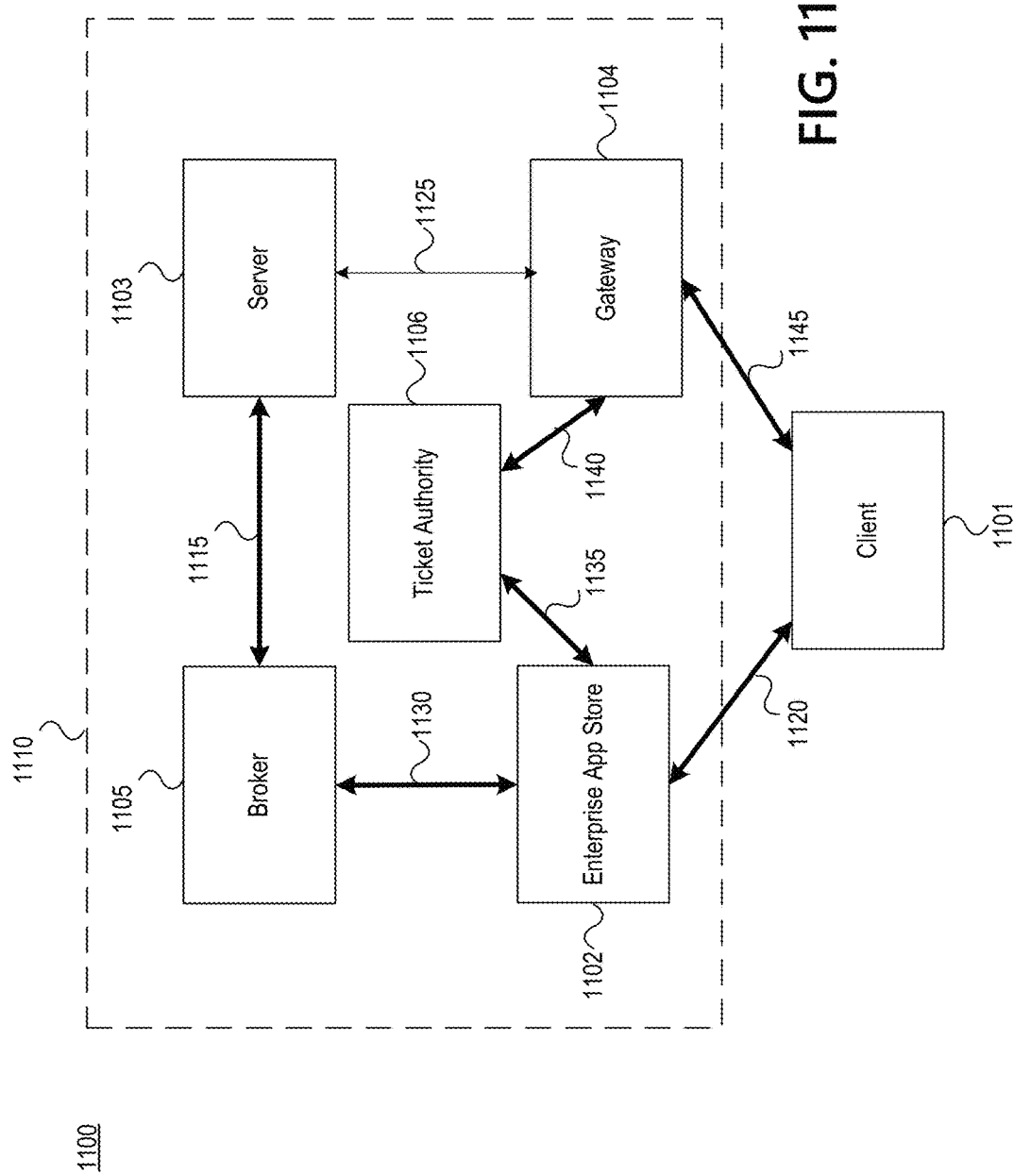
FIG. 11 illustrates an example block diagram where the secure connection to the server is established between a gateway device of an enterprise and the server in accordance with one or more illustrative aspects described herein.

Additionally, the example embodiments of FIGS. 9-11 and 12A-12C may describe additional features not present in FIG. 8. For example, FIGS. 9-11 and 12A-12C illustrate an intermediary device between the broker 905 and the client 901. In FIGS. 9 and 10, the intermediary device is an enterprise application store (e.g., application store 578 of FIG. 5). In FIGS. 11 and 12, the intermediary device is a gateway (e.g., gateway device 560 of FIG. 5, or gateway server 606 of FIG. 6). Other intermediary devices could be used in addition to or as an alternative from the enterprise application store and the gateway. For example, one or more proxy devices could be used as an intermediary device and perform some or all of the functions performed by the intermediary devices of FIGS. 9-11 and 12A-12C.

FIGS. 9 and 10 illustrate an example embodiment where the secure connection to the server is established between the client and the server. In particular, FIG. 9 illustrates an example block diagram where the secure connection to the server is established between the client and the server. FIG. 10 illustrates an example process flow where the secure connection to the server is established between the client and the server.

In FIG. 9, a client 901 may communicate with an enterprise application store 902 via data connection 920. The data connection 920 may be an integrity-protected channel between the enterprise application store 902 and the client 901, and the authentication process for that integrity-protected channel may have been previously performed. The broker 905 may communicate with the enterprise application store 902 via data connection 930. Data connection 930 may be an integrity-protected data channel between the broker 905 and the enterprise application store 902, and the authentication process for that integrity-protected channel may have been previously performed. The broker 905 may communicate with the server 903 via data connection 915. Data connection 915 may be an integrity-protected data channel between the server 901 and the broker 903, and the authentication process for that integrity-protected channel may have been previously performed. The broker 905, the server 903 and the enterprise application store 902 may be managed or otherwise controlled by enterprise 910. The broker 905 may be a desktop delivery controller of the enterprise and the server 903 may be a virtualization server of the enterprise and may be configured as a virtual delivery agent (e.g., an HDX Server developed by Citrix Systems). By communicating via connections 915, 930, and 920, the client may ultimately receive security credentials for the server 903, which enable the client 901 to establish a secure connection 925 between the client 901 and the server 903. The secure connection 925 may be a confidentiality- and integrity-protected connection (e.g., a TLS connection).

FIG. 10 illustrates an example process flow for establishing the secure connection 925. In FIG. 10, the process flow begins, at 1001, with the server 903 being brought on-line and registering with the broker 905. Bringing the server on-line may include booting, installing, or otherwise configuring the server 903 according to the enterprise's policy. In some variations, the server 903 may be configured as a virtual delivery agent. When being brought on-line, the server 903 may generate its security credentials. The server's security credentials may include, for example, an asymmetric key pair and a corresponding self-issued or self-signed certificate. In some variations, the generation of the self-issued or self-signed certificate may include the server 903 first generating a CA certificate, and then generating the self-issued or self-signed certificate that is signed using the CA certificate.

The registration with the broker 905 may be performed by communicating with the broker 905 using an integrity-protected connection (e.g., connection 915). As part of the registration process, the server 903 may provide the broker 905 with its security credentials. The server 903 may include additional security information to the broker 905 during the registration process. For example, the server 903 may provide a certificate signing request (CSR) for the self-issued or self-signed certificate. The CSR may be configured to prove possession of the private key within the key pair. The broker 905 may, as part of the registration process, perform an initial authentication process with the server 903 to verify its identity.

Additionally, as part of the registration process, the broker 905 may store the server's security credentials in a secure location of the enterprise 910. For example, the broker 905 may store the self-issued or self-signed certificate in an enterprise directory service (which may be accessible to other brokers of the enterprise) and/or data indicating the association between the server's identity and the self-issued or self-signed certificate. In some variations, if the directory service already has a record for the server 903, the existing record may be replaced with a new record having the most recently-received information (e.g., the security credentials received during the current registration process for the server 903). The directory service may be a directory server, a database, or other suitable access-controlled and integrity-protected storage mechanism.

At 1003, the client 901 may transmit, to the enterprise application store 902, a request for an enterprise resource or enterprise service. For example, the request may be for a remote desktop service. Additionally, based on a previous authentication process with the client, the request for the enterprise resource or enterprise service may be transmitted via an integrity-protected data connection (e.g., data connection 920). If the client 901 has not been previously authenticated, the enterprise application store 902 may initiate an authentication process with the client 901 prior to proceeding.

At 1005, the enterprise application store 902 may, in response to the request of 1003, request launch details from the broker 905. For example, the request for the launch details may be a request for the address information of a server that will handle the client's session for the remote desktop service.

At 1007, the broker 905 may, in response to the request of 1005, assign the session for the remote desktop service to the server 903 and may transmit, to the server 903, a request for one or more parameters. For example, the one or more parameters may be for address and port information of the server 903. The request may be transmitted to the server 903 via an integrity-protected connection (e.g., data connection 915).

At 1009, the server 903 may, in response to the request of 1007, transmit, to the broker 903, the one or more parameters and information for the secure connection that the client may use to access the server 903. The one or more parameters may include the address information (e.g., Common Gateway Protocol (CGP) address and/or an ICA address) and port information (e.g., a CGP port and/or an ICA port). The information for the secure connection may include the server's self-signed or self-issued certificate and the address of the listening service for the secure connection. The one or more parameters and the information for the secure connection may be transmitted via an integrity-protected connection (e.g., data connection 915).

At 1011, the broker 905 may transmit, to the enterprise application store 902, the parameters and the information for the secure connection. Additionally, prior to sending the one or more parameters and the information for the secure connection, the broker may re-authenticate the server 903. The re-authentication may include repeating the authentication process that was performed in connection with the server's registration, or by verifying that the certificate received in connection with 1009 was the same that the broker 905 received in connection with 1001.

At 1013, the enterprise application store 902 may generate data based on the one or more parameters and include the information for the secure connection in the data. The data may be an .ICA file usable for the session of the remote desktop service. The .ICA file may include the information for the secure connection.

At 1015, the enterprise application store 902 may transmit, to the client 901, the data generated at 1013. The data may be transmitted via an integrity-protected connection (e.g., data connection 920).

At 1017, the client 901 may establish the secure connection with the server 903 and may authenticate the server 903 based on the information for the secure connection. For example, using the address for the listening service, the client 901 may establish the secure connection with the server 903. Any data sent via the secure connection may be encrypted/decrypted based on the key included in the .ICA file. The secure connection (e.g., data connection 925) may be a confidentiality and integrity-protected connection, such as a TLS connection. In response the server 903 may (as shown at 1019 of FIG. 10), transmit, to the client via the secure connection, its security credentials to the client 901. Upon receipt, the client 901 may authenticate the server 903 based on the server's security credentials received via the secure connection to the server 903 and the security credentials provided in the .ICA file from the enterprise application store 902. For example, the client 901 may validate that the self-issued or self-signed certificate in the .ICA file matches the self-issued or self-signed certificate received via the secure connection to the server 903. In some arrangements, if the secure connection is a TLS connection, conventional TLS processes for validation may be used.

At 1021, the client 901 may use the secure connection to the server 903. For example, the client 901 may use the secure connection to transmit and/or receive data from the server 903 in support of the session for the remote desktop service. Any data transmitted/received via the secure connection to the server 903 may be encrypted/decrypted using the key pair that was included in the .ICA file.

Based on the above-described process flow of FIG. 10, the client 901 may be able conduct a session for a remote desktop service that uses a confidentiality- and integrity-protected connection (e.g., a TLS connection between the client 901 and the server 903). Additionally, the above-described process flow allows the session to be conducted without using a third-party authentication service and without requiring a third-party CA to issue a CA certificate for the server 903. Further, while the above-described process flow of FIG. 10 is described as using one or more previously-established integrity-protected connections (e.g., data connections 915, 930 and 920 of FIG. 9), each of the transmissions via a previously-established integrity-protected connection could be substituted with a transmission of one or more integrity-protected messages without affecting the overall flow described in connection with FIG. 10. In some variations, a mixture of previously-established integrity-protected connections and integrity-protected messages could be used (e.g., transmissions between server 903 and broker 905 may use integrity-protected messages, and transmissions between the enterprise app store 902 and the client 901 may use an integrity-protected connection).

Figure 12A:
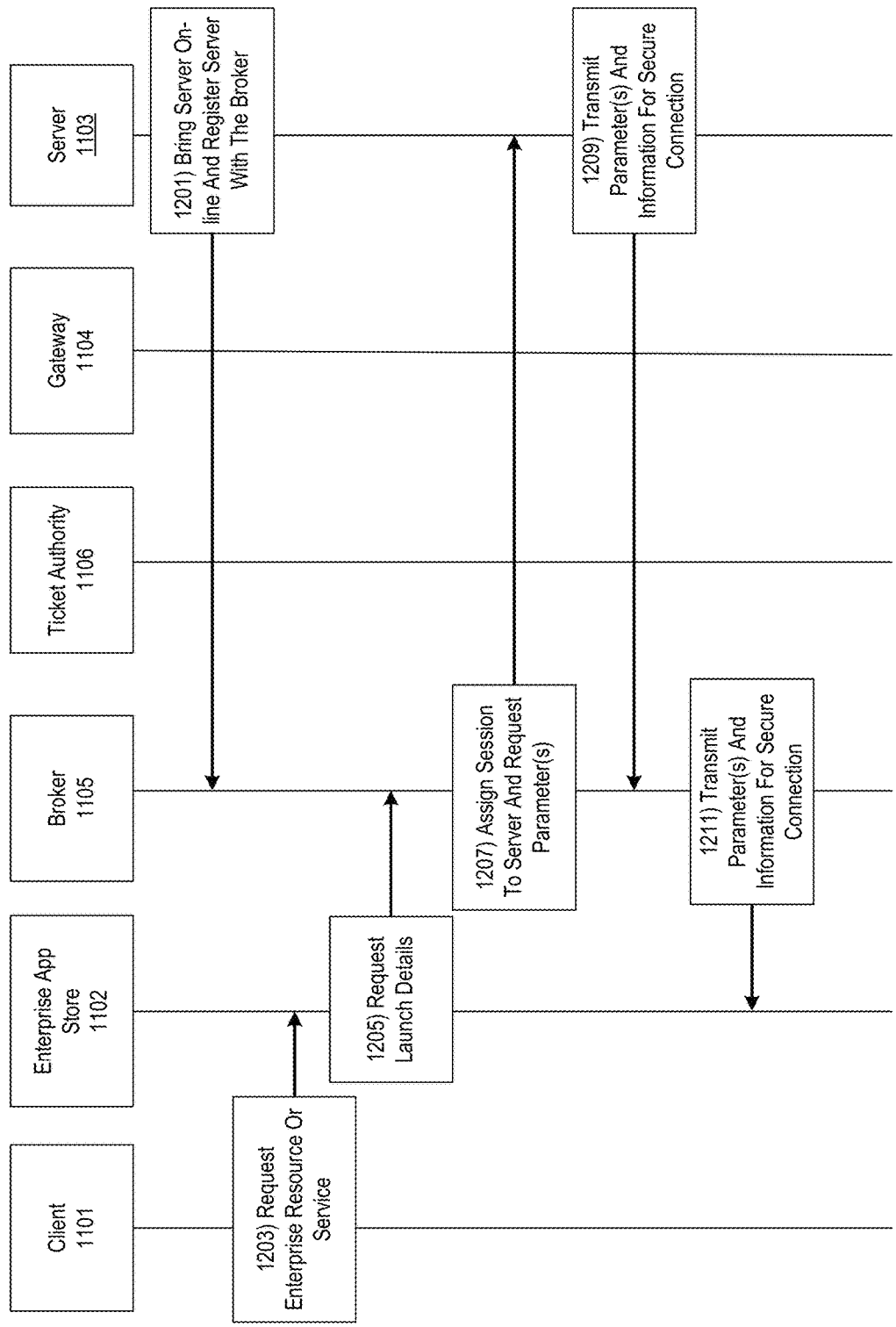
FIGS. 12A-12C illustrate an example process flow where the secure connection to the server is established between a gateway device of an enterprise and the server in accordance with one or more illustrative aspects described herein.
Figure 12B:
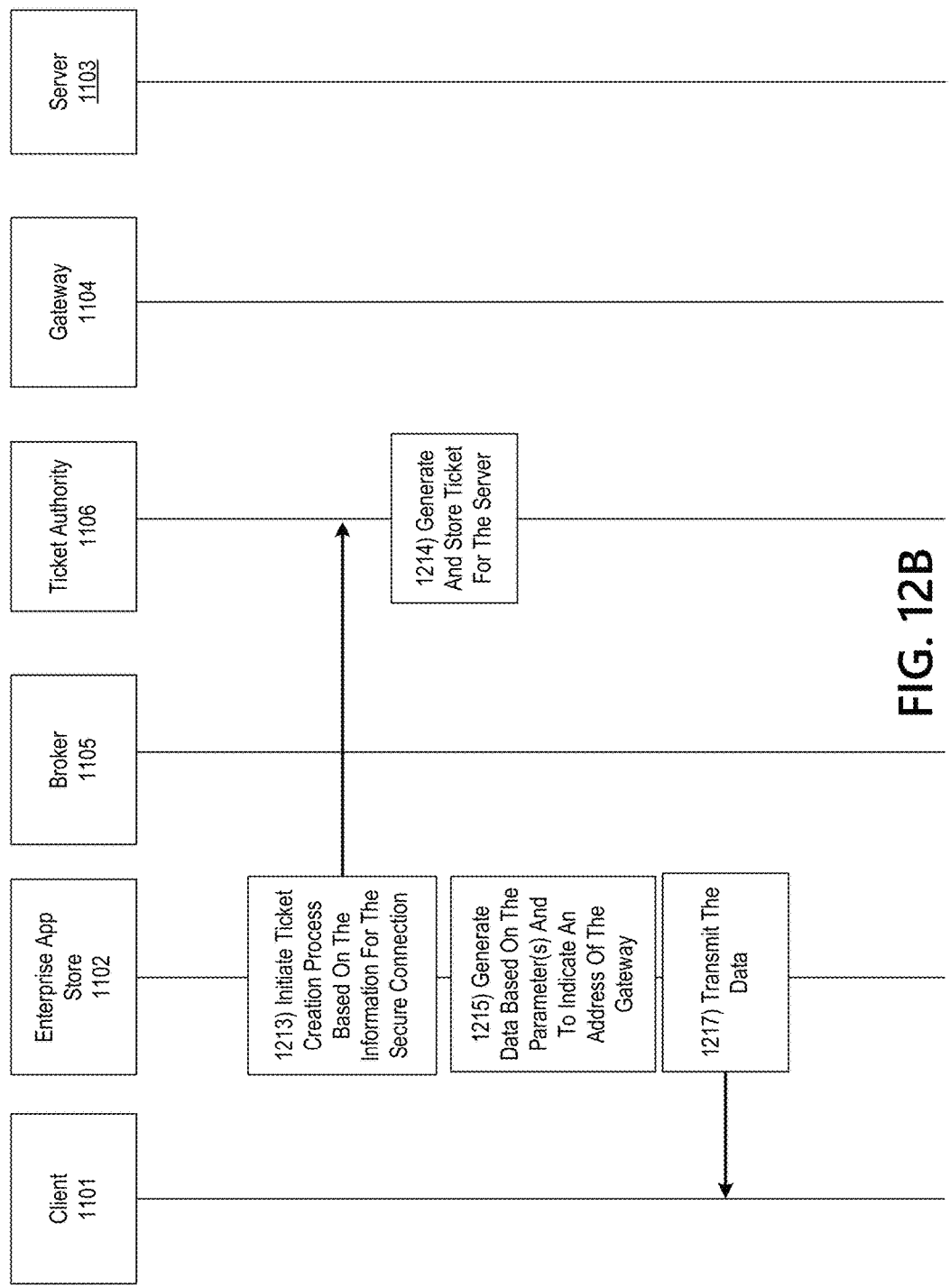
Figure 12C:
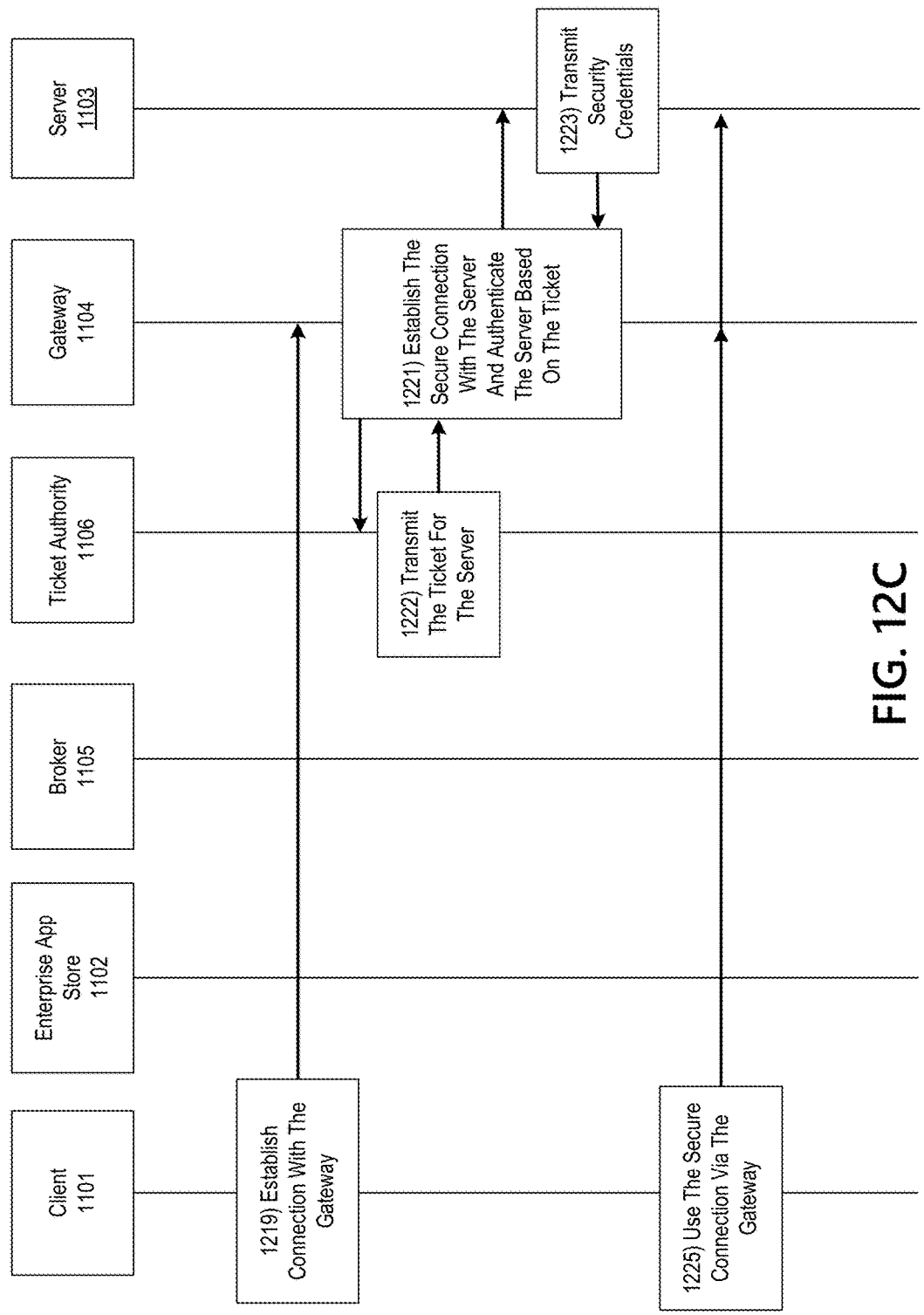

FIGS. 11 and 12A-12C illustrate an example embodiment where the secure connection to the server is established between a gateway of an enterprise and the server. In particular, FIG. 11 illustrates an example block diagram where the secure connection to the server is established between a gateway of an enterprise and the server. FIGS. 12A-12C illustrate an example process flow where the secure connection to the server is established between a gateway of an enterprise and the server.

In FIG. 11, a client 1101 may communicate with an enterprise application store 1102 via data connection 1120. The client 1101 may also communicate with a gateway 1104 via data connection 1145. The broker 1105 may communicate with the server 1103 via data connection 1115. The enterprise application store 1102 may communicate with a ticket authority 1106 via data connection 1135. The enterprise application store 1102 may communicate with the broker 1105 via data connection 1130. The gateway 1104 may communicate with the server 1103 via data connection 1125. The gateway 1104 may also communicate with the ticket authority 1106 via data connection 1140. Each of the data connections 1115, 1120, 1130, 1135 and 1140 may carry integrity-protected messages. For example, each integrity-protected message may include one or more of a message integrity code (MIC), a checksum, an error detection code, a hash code, a keyed hash, a message authentication or a protected checksum. The processes that authenticate the various parties so that the integrity-protected messages can be transmitted via the various data connections may have been previously performed. Data connection 1145 may be a TLS connection that uses a server certificate (e.g., as described in connection with FIG. 6).

The broker 1105, the server 1103, the ticket authority 1106, the enterprise application store 1102, and the gateway 1104 may be managed or otherwise controlled by enterprise 1110. The broker 1105 may be a desktop delivery controller of the enterprise. The server 1103 may be a virtualization server of the enterprise and may be configured as a virtual delivery agent (e.g., an HDX Server developed by Citrix Systems). By communicating via connections 1115, 1120, 1135, 1140 and 1145, the client 1101 may ultimately receive access to the secure connection 1125 via the gateway 1104. In the depicted embodiment, the gateway 1104 establishes the secure connection 1125 to the server 1103. The secure connection 1125 may be a confidentiality- and integrity-protected connection (e.g., a TLS connection).

FIGS. 12A and B illustrates an example process flow for establishing the secure connection 1125. In FIG. 12A, the process flow begins, at 1201, with the server 1103 being brought on-line and registering with the broker 1105. Bringing the server on-line may include booting, installing, or otherwise configuring the server 1103 according to the enterprise's policy. In some variations, the server 1103 may be configured as a virtual delivery agent. When being brought on-line, the server 1103 may generate its security credentials. The server's security credentials may include, for example, an asymmetric key pair and a corresponding self-issued or self-signed certificate. In some variations, the generation of the self-issued or self-signed certificate may include the server 1103 first generating a CA certificate, and then generating the self-issued or self-signed certificate that is signed using the CA certificate.

The registration with the broker 1105 may be performed by communicating with the broker 1105 using integrity-protected messages. As part of the registration process, the server 1103 may provide the broker 1105 with its security credentials within one or more of the integrity-protected messages. The server 1103 may include additional security information to the broker 1105 during the registration process. For example, the server 1103 may provide a certificate signing request (CSR) for the self-issued or self-signed certificate. The CSR may be configured to prove possession of the private key within the key pair. The broker 1105 may, as part of the registration process, perform an initial authentication process with the server 1103 to verify its identity.

Additionally, as part of the registration process, the broker 1105 may store the server's security credentials in a secure location of the enterprise 1110. For example, the broker 1105 may store the self-issued or self-signed certificate in an enterprise directory service (which may be accessible to other brokers of the enterprise) and/or data indicating the association between the server's identity and the self-issued or self-signed certificate. In some variations, if the directory service already has a record for the server 1103, the existing record may be replaced with a new record having the most recently-received information (e.g., the security credentials received during the current registration process for the server 1103). The directory service may be a directory server, a database, or other suitable access-controlled and integrity-protected storage mechanism.

At 1203, the client 1101 may transmit, to the enterprise application store 1102, a request for an enterprise resource or enterprise service. For example, the request may be for a remote desktop service. Additionally, based on a previous authentication process with the client, the request for the enterprise resource or enterprise service may be transmitted within one or more integrity-protected messages. If the client 1101 has not been previously authenticated, the enterprise application store 1102 may initiate an authentication process with the client 1101 prior to proceeding.

At 1205, the enterprise application store 1102 may, in response to the request of 1203, request launch details from the broker 1105. For example, the request for the launch details may be a request for the address information of a server that will handle the client's session for the remote desktop service.

At 1207, the broker 1105 may, in response to the request of 1205, assign the session for the remote desktop service to the server 1103 and may transmit, to the server 1103, a request for one or more parameters. For example, the one or more parameters may be for address and port information of the server 1103. The request may be transmitted to the server 1103 within one or more integrity-protected messages.

At 1209, the server 1103 may, in response to the request of 1207, transmit, to the broker 1103, the one or more parameters and information for the secure connection that may be used to access the server 1103 using the secure connection. The one or more parameters may include the address information (e.g., Common Gateway Protocol (CGP) address and/or an ICA address) and port information (e.g., a CGP port and/or an ICA port). The information for the secure connection may include the server's self-signed or self-issued certificate and the address of the listening service for the secure connection. The one or more parameters and the information for the secure connection may be transmitted within one or more integrity-protected messages.

At 1211, the broker 1105 may transmit, to the enterprise application store 1102, the parameters and the information for the secure connection. Additionally, prior to sending the one or more parameters and the information for the secure connection, the broker may re-authenticate the server 1103. The re-authentication may include repeating the authentication process that was performed in connection with the server's registration, or by verifying that the certificate received in connection with 1209 was the same that the broker 1105 received in connection with 1201.

The process flow of FIG. 12A, represented by 1201-1211, proceeds similar to the corresponding portion of the process flow of FIG. 10 (e.g., 1001-1011), except, as described above in connection with the description of 1201-1211, for the use of integrity-protected messages instead of integrity-protected connections. Additional differences between the process flows of FIG. 10 and FIG. 12A-12C are illustrated beginning at 1213, which is illustrated at FIG. 12B. However, unless otherwise noted, the use of integrity-protected messages could be substituted for data transmissions via a previously-established secure connection without affecting the overall flow described in connection with FIGS. 12A-12C. In some variations, a mixture of previously-established secure connections and integrity-protected messages could be used (e.g., transmissions between server 1103 and broker 1105 may use integrity-protected messages, and transmissions between the enterprise app store 1102 and the client 1101 may use an integrity-protected connection).

As illustrated at 1213 of FIG. 12B, the enterprise application store 1102 may initiate a ticket creation process based on the information for the secure connection. For example, the enterprise application store 1102 may transmit the one or more parameters and the information for the secure connection to the ticket authority 1006. The transmission to the ticket authority 1106 may be performed using one or more integrity-protected messages.

At 1214, the ticket authority 1006 may generate and store the ticket for the server 1101. The ticket for the server 1101 may include the one or more parameters and the information for the secure connection. The ticket for the server 1101 may be stored in a secure enterprise location accessible only to the ticket authority.

At 1215, the enterprise application store 1102 may generate data based on the one or more parameters and to indicate an address of the gateway 1104. The data may be an .ICA file usable for the session of the remote desktop service with the SSLProxyHost parameter set to an address of the gateway 1104 and an SSL certificate for authenticating the gateway 1104.

At 1217, the enterprise application store 1102 may transmit, to the client 1101, the data generated at 1215. The data may be transmitted using one or more integrity-protected messages.

The example process flow continues on FIG. 12C. At 1219 of FIG. 12C, the client 1101 may establish a connection with the gateway 1104 based on the data received at 1217. For example, the client 1101 may establish a TLS connection to the gateway 1104 based on the .ICA file transmitted from the enterprise application store 1102. As part of the process for establishing the TLS connection to the gateway 1104, the gateway 1104 may provide a copy of the server certificate. The client 1101 may use this copy and the server certificate from the .ICA file to authenticate the gateway 1104.

At 1221, the gateway 1104 establish the secure connection with the server 1101 and authenticate the server based on the ticket. Performing the establishing process may include transmitting, from the gateway 1104 to the ticket authority 1106, a request for the ticket for the server. At 1222, in response the ticket authority 1106 may retrieve and transmit, to the gateway 1104, the ticket for the server 1101. The request for the ticket and the ticket for the server may be transmitted as one or more integrity-protected messages.

Based on the information within the ticket for the server, the gateway 1104 may establish the secure connection 1125. For example, using the address for the listening service, the gateway 1104 may establish the secure connection (e.g., connection 1125) with the server 1103. The secure connection may be a confidentiality and integrity-protected connection, such as a TLS connection.

In response to establishment of the secure connection with the gateway 1104, the server 1103 may (as shown at 1223 of FIG. 12C) transmit, to the gateway 1104 via the secure connection 1125, its security credentials. Upon receipt, the gateway 1104 may authenticate the server 1103 based on the server's security credentials received via the secure connection and the security credentials provided in the ticket. For example, the gateway 1104 may validate that the self-issued or self-signed certificate in the ticket matches the self-issued or self-signed certificate received via the secure connection to the server 1103. In some arrangements, if the secure connection is a TLS connection, conventional TLS processes for validation may be used.

At 1225, the client 1101 may, via the gateway 1104, use the secure connection to the server 1103. For example, the client 101 may transmit, to the gateway 1104 via the TLS connection to the gateway 1104, data destined for the server 1103. Upon receipt, the gateway 1104 may process the data for transmission via the secure connection to the server 1103. This processing may include decrypting the data using a first key associated with the TLS connection and then encrypting the data using the public key from the key pair for the secure connection. Once processed, the gateway 1104 may transmit the data to the server 1103 via the secure connection. In this manner, the gateway 1104 may support the session for the remote desktop service.

Based on the above-described process flow of FIGS. 12A-12C, the client 1101 may be able to conduct a session for a remote desktop service that uses a confidentiality- and integrity-protected connection (e.g., a TLS connection between the gateway 1104 and the server 1103). Additionally, the above-described process flow allows the session to be conducted without using a third-party authentication service and without requiring a third-party CA to issue a CA certificate for the server 1103. Further, the above-described process flow allows the session to be conducted without the client 1101 being aware of the security credentials of the server 1103.

The example embodiments of FIGS. 9-11 and 12A-12C are only two of the many embodiments that may be realized based on the above-described methods, block diagrams, and system architectures, etc., described throughout this disclosure. For example, one or more aspects of the two example embodiments of FIGS. 9-11, 12A-12C may be used in other embodiments. As one particular example, the integrity-protected connections of FIGS. 9 and 10 may be used in place of the integrity-protected messages of FIGS. 11 and 12A-12C, or vice versa. Other ways in which the above-described embodiments could be modified include using a datagram transport layer security (DTLS) connection instead of the TLS connection for the secure connection to the server. Another variation includes the server generating the asymmetric key pair and self-signed or self-issued certificate only on demand from the broker, rather than at a time of registration.

Additional variations relate more closely to the arrangement depicted in FIGS. 9 and 10. For example, instead of communicating the self-signed or self-issued certificate to the client 901, a derivation based on the self-signed or self-issued certificate that has the required security properties could be transmitted to the client 901 within the .ICA file. Such derivations may include a fingerprint or thumbprint of the self-signed or self-issued certificate, or a simple public key infrastructure (SPKI) encoding of the self-signed or self-issued certificate. As another example, in addition to providing the self-signed or self-issued certificate within the .ICA file that is transmitted to the client 903, the server's CA certificate that was used in generating the self-signed or self-issued certificate may also be included in the .ICA file. The client 903 may use the server's CA certificate when authenticating the server 901 using a process that is similar to the validation of the self-signed or self-issued certificate described at 1021 of FIG. 10.

A further variation includes adding a dedicated (e.g., enterprise-captive) certificate authority component that is managed or otherwise controlled by the enterprise (e.g., enterprise 910 or 1110) that issues an intermediate CA certificate for the server. The intermediate CA certificate and the self-signed or self-issued certificate can be used to generate a cross-certificate. The cross-certificate would be used by the client or gateway to establish the secure connection to the server instead of the self-signed or self-issued certificate. The certificate authority component could be integrated with the directory service.

A yet further variation includes using a certificate template to select the certificate options (for example algorithm and key length) that are used to generate the self-signed or self-issued certificate.

Another variation relates to if the server supports measured boot and is not stateless. If these conditions are satisfied, the private key for the self-signed or self-issued certificate may be linked to the boot measurements so that the private key is only available on a successful measured boot.

Another variation relates to if the server supports key attestation and if a dedicated certificate authority component is used and also supports key attestation. If these conditions are satisfied, intermediate CA certificate may be issued with key attestation if the attestation is successful. Additionally, one or more policy constraints may be included in the root certificate of the dedicated certificate authority component, so that client can determine that the intermediate CA certificate includes that key attestation.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
    establishing a first secure data connection between a computing device and a client device;
    generating, by a server, a self-signed or self-issued certificate for authenticating the server;
    receiving, by the computing device, a request for an enterprise resource or enterprise service associated with the server;
    generating first data to indicate an address of a gateway;
    storing, in a location accessible to the gateway, the self-signed or self-issued certificate;
    sending, to the client device via the first secure data connection, the first data;
    based on a second secure data connection being established between the gateway and the client device, receiving, by the gateway and from the location, a first copy of the self-signed or self-issued certificate;
    establishing, by the gateway, a third secure data connection between the gateway and the server;
    receiving, by the gateway and from the server via the third secure data connection, a second copy of the self-signed or self-issued certificate;
    authenticating, by the gateway, based on the first copy of the self-signed or self-issued certificate and the second copy of the self-signed or self-issued certificate, the server; and
    sending, by the gateway and to the server via the third secure data connection, second data originally sent from the client device.

2. The method of claim 1, wherein sending the first data is performed based on one or more integrity-protected messages.

3. The method of claim 1, wherein receiving the request for the enterprise resource or the enterprise service is performed by receiving one or more integrity-protected messages.

4. The method of claim 1, wherein the request for the enterprise resource or enterprise service comprises a request for a session of a remote desktop service;
    wherein receiving the second copy of the self-signed or self-issued certificate is performed based on a request to a ticket authority; and
    wherein the second data is associated with the session of the remote desktop service.

5. The method of claim 1, wherein the third secure data connection is a confidentiality- and integrity-protected connection.

6. The method of claim 5, wherein the third secure data connection is a Transport Layer Security (TLS) connection, and wherein the self-signed or self-issued certificate is a self-issued certificate.

7. The method of claim 1, further comprising:
registering the server with a broker; and
assigning, by the broker, the server to a session for the enterprise resource or enterprise service.

8. The method of claim 7, wherein the computing device is configured as an application store that enables download of one or more applications to the client device, and wherein the server, the broker, the location, and the application store are associated with an enterprise.

9. A method comprising:
establishing a first secure data connection between a computing device and a client device;
generating, by a server, a self-signed or self-issued certificate for authenticating the server;
receiving, by the computing device, a request for an enterprise resource or enterprise service associated with the server;
generating first data to indicate an address of a gateway;
sending, to the client device via the first secure data connection, the first data;
generating, by a ticket authority, a ticket that indicates address information for the server and the self-signed or self-issued certificate;
establishing a second secure data connection between the gateway and the client device;
retrieving, by the gateway and from the ticket authority, the ticket;
establishing, based on the address information indicated by the ticket, a third secure data connection, wherein the third secure data connection is between the gateway and the server;
receiving, by the gateway and from the server via the third secure data connection, a copy of the self-signed or self-issued certificate;
authenticating, by the gateway, based on the self-signed or self-issued certificate indicated by the ticket and the copy of the self-signed or self-issued certificate, the server; and
sending, by the gateway and to the server via the third secure data connection, second data originally sent from the client device.

10. The method of claim 9, wherein sending the first data is performed based on one or more integrity-protected messages.

11. The method of claim 9, wherein receiving the request for the enterprise resource or the enterprise service is performed by receiving one or more integrity-protected messages.

12. The method of claim 9, wherein the request for the enterprise resource or enterprise service comprises a request for a session of a remote desktop service, and wherein the second data is associated with the session of the remote desktop service.

13. The method of claim 9, wherein the third secure data connection is a confidentiality-and integrity-protected connection.

14. The method of claim 13, wherein the third secure data connection is a Transport Layer Security (TLS) connection, and wherein the self-signed or self-issued certificate is a self-issued certificate.

15. The method of claim 9, further comprising:
registering the server with a broker;
receiving, by the broker and from the server, the self-signed or self-issued certificate;
assigning, by the broker, the server to a session for the enterprise resource or enterprise service;
wherein the computing device is configured as an application store that enables download of one or more applications to the client device; and
wherein the server, the broker, the ticket authority, the gateway, and the application store are associated with an enterprise.

16. A method comprising:
generating, by a server associated with an enterprise, a self-signed or self-issued certificate for authenticating the server;
establishing a first secure data connection between a computing device associated with the enterprise and a client device;
receiving, by the computing device from the client device via the first secure data connection, a request for an enterprise resource or enterprise service associated with the server;
sending, by the computing device, first data that indicates an address of a gateway associated with the enterprise;
establish a second secure data connection between the gateway and the client device;
establishing, by the gateway, a third secure data connection between the gateway and the server;
authenticating, by the gateway, based on a first copy of the self-signed or self-issued certificate that is stored in a location associated with the enterprise and a second copy of the self-signed or self-issued certificate sent to the gateway from the server, the server; and
sending, by the gateway and to the server via the third secure data connection, second data originally sent from the client device.

17. The method of claim 16, wherein sending the first data is performed based on one or more integrity-protected messages.

18. The method of claim 16, wherein the self-signed or self-issued certificate is a self-issued certificate; wherein receiving the request for the enterprise resource or the enterprise service is performed by receiving one or more integrity-protected messages.

19. The method of claim 16, wherein the request for the enterprise resource or enterprise service comprises a request for a session of a remote desktop service, and wherein the second data originally sent from the client device is associated with the session of the remote desktop service.

20. The method of claim 16, wherein the third secure data connection is a confidentiality- and integrity-protected connection, and wherein the method further comprises:
based on establishing the third secure data connection, receiving, by the gateway and from the server via the third secure data connection, the second copy of the self-signed or self-issued certificate.

* * * * *